(12) United States Patent
Kim (10) Patent No.: US 12,115,961 B2
(45) Date of Patent: Oct. 15, 2024

(54) METHOD AND APPARATUS FOR CONTROLLING ELECTRO-HYDRAULIC BRAKE

(71) Applicant: HYUNDAI MOBIS CO., LTD., Seoul (KR)

(72) Inventor: Pil Jun Kim, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 376 days.

(21) Appl. No.: 17/409,939

(22) Filed: Aug. 24, 2021

(65) Prior Publication Data
US 2022/0055588 A1 Feb. 24, 2022

(30) Foreign Application Priority Data
Aug. 24, 2020 (KR) .................. 10-2020-0106266

(51) Int. Cl.
*B60T 8/88* (2006.01)
*B60T 8/176* (2006.01)
(Continued)

(52) U.S. Cl.
CPC .............. *B60T 8/885* (2013.01); *B60T 8/176* (2013.01); *B60T 8/92* (2013.01); *B60T 13/142* (2013.01);
(Continued)

(58) Field of Classification Search
CPC . B60T 8/885; B60T 8/176; B60T 8/92; B60T 13/142; B60T 2270/10;
(Continued)

(56) References Cited

U.S. PATENT DOCUMENTS

| 2015/0344012 A1* | 12/2015 | Knechtges | ............ B60T 13/686 |
| | | | 701/70 |
| 2019/0366997 A1* | 12/2019 | Jeong | ............... B60T 13/167 |
| 2020/0001843 A1 | 1/2020 | Strehle et al. | |

FOREIGN PATENT DOCUMENTS

| CN | 105752072 A | 7/2016 |
| CN | 110733489 A | 1/2020 |

(Continued)

OTHER PUBLICATIONS

Office Action issued May 31, 2023 in corresponding Chinese Patent Application No. 202110976890.X.
(Continued)

*Primary Examiner* — Yi-Kai Wang
(74) *Attorney, Agent, or Firm* — NovoTechIP International PLLC (57) ABSTRACT

A method of controlling an electro-hydraulic brake system comprising a main brake unit and redundancy brake unit, the method comprising: determining a failure type of the main brake unit, the failure type being one of a plurality of failure types comprising: a sensor failure type comprising a failure occurred at a first sensor connected to the main brake unit; an independent wheel control failure type comprising a failure at the main brake unit to perform an independent wheel control; a hydraulic pressure generation failure type comprising a failure at the main brake unit to form a hydraulic pressure; and an inoperable failure type comprising the main brake being not controllable; and in response to determining that the failure type of the main brake unit is the sensor failure type or the independent wheel control failure type, causing the main brake unit to generate a braking force, in response to determining that the failure type of the main (Continued)

brake unit is the hydraulic pressure generation failure type or the inoperable type, causing the redundancy brake unit to generate a braking force.

8 Claims, 5 Drawing Sheets

(51) Int. Cl.
*B60T 8/92* (2006.01)
*B60T 13/14* (2006.01)

(52) U.S. Cl.
CPC ..... *B60T 2270/10* (2013.01); *B60T 2270/413* (2013.01)

(58) Field of Classification Search
CPC ............. B60T 2270/413; B60T 13/662; B60T 2270/402; B60T 2270/406; B60T 17/221; B60T 17/22; B60T 13/745; B60T 7/04; B60T 8/171; B60T 8/26; B60T 13/14; B60T 2270/40; G05G 5/03; B60Y 2306/15

USPC .......................................................... 701/70
See application file for complete search history.

(56) References Cited

FOREIGN PATENT DOCUMENTS

| | | |
|---|---|---|
| DE | 102012025247 A1 | 6/2014 |
| DE | 102018003001 A1 | 10/2019 |
| DE | 102018206563 A1 | 10/2019 |
| DE | 102019207955 A1 | 12/2019 |
| KR | 20180094494 A | 8/2018 |
| KR | 20190035125 A | 4/2019 |

OTHER PUBLICATIONS

Extended European Search Report issued Jan. 24, 2022 in corresponding European Patent Application No. 21192402.2.

* cited by examiner

METHOD AND APPARATUS FOR CONTROLLING ELECTRO-HYDRAULIC BRAKE

CROSS-REFERENCE TO RELATED APPLICATIONS

This application is based on, and claims priority from, Korean Patent Application Number 10-2020-0106266, filed Aug. 24, 2020, the disclosure of which is incorporated by reference herein in its entirety.

BACKGROUND OF THE INVENTION

1. Field of the Invention

The present disclosure in some embodiments relates to a method and a system or apparatus for controlling an electro-hydraulic brake.

2. Discussion of Related Art

The content described in this section merely provides background information for the present disclosure and does not constitute prior art.

The apparatus for electro-hydraulic brake includes a depression amount sensor that detects a depression amount of a pedal to detect the brake pressure required by the driver. The apparatus for electro-hydraulic brake adjusts the brake pressure of each wheel by the hydraulic pressure of the master cylinder driven by the motor after the driver's depression is detected. The apparatus for electro-hydraulic brake also includes a pedal simulator that allows the driver to feel the same pedal pressure as in conventional apparatus for hydraulic brake. Therefore, when the driver depresses the brake pedal, the electronic control unit senses this and supplies the hydraulic pressure to the master cylinder. The master cylinder transmits the brake hydraulic pressure to the wheel cylinders of each wheel, and supplies the brake force to each wheel.

A conventional apparatus for brake includes a main brake unit to provide assistant brake force when the main brake unit is abnormal in operation. A redundancy brake unit is a backup system that controls the braking of a vehicle in the event of a failure of the main brake unit. Conventional redundancy brake unit only monitors the main brake unit when the main brake unit is operating properly and goes into waiting state. Meanwhile, when the main brake unit operates inappropriately, the main brake unit does not brake the vehicle, and the redundancy brake unit passes the controls the vehicle.

However, the redundancy brake unit is generally designed to control only the front wheels, therefore the braking performance is insufficient compared to that of the main brake unit.

BRIEF SUMMARY OF THE INVENTION

There is provided a method of controlling an electro-hydraulic brake system comprising a main brake unit and redundancy brake unit, the method comprising: determining a failure type of the main brake unit, the failure type being one of a plurality of failure types comprising: a sensor failure type comprising a failure occurred at a first sensor connected to the main brake unit; an independent wheel control failure type comprising a failure at the main brake unit to perform an independent wheel control; a hydraulic pressure generation failure type comprising a failure at the main brake unit to form a hydraulic pressure; and an inoperable failure type comprising the main brake being not controllable; and in response to determining that the failure type of the main brake unit is the sensor failure type or the independent wheel control failure type, causing the main brake unit to generate a braking force, in response to determining that the failure type of the main brake unit is the hydraulic pressure generation failure type or the inoperable type, causing the redundancy brake unit to generate a braking force. Tere is also provided an electro-hydraulic brake system comprising: a wheel cylinder unit configured to provide a braking force to front wheels and rear wheels of a vehicle; a main brake unit comprising a pedal cylinder unit configured to change a pressure of a brake fluid in response to a pedal input from a driver, and a master cylinder unit configured to change the pressure of the brake fluid in conjunction with a motor; a redundancy brake unit comprising an electric pump unit configured to pump the brake fluid, wherein the redundancy brake unit is configured, when a failure has not occurred at the main brake unit, to monitor the main brake unit, when a failure has occurred at the main brake unit, to assist the main brake unit based on a failure type of the main brake; and a reservoir configured to store the brake fluid and supply the brake fluid to the main brake unit and the redundancy brake unit.

| REFERENCE NUMERALS | |
|---|---|
| 1: main brake unit | 2: reservoir |
| 3: redundancy brake unit | 4: wheel cylinder unit |
| 10: first redundancy flow unit | 20: second redundancy flow unit |
| 30: third redundancy flow unit | 40: fourth redundancy flow unit |
| 50: fifth redundancy flow unit | 60: sixth redundancy flow unit |
| 70: seventh redundancy flow unit | 80: recovery unit |
| 90: electric pump unit | 110: pedal cylinder unit |
| 120: master cylinder unit | 130: first main hydraulic pressure unit |
| 140: second main hydraulic pressure unit | 150: third main hydraulic pressure unit |

DETAILED DESCRIPTION OF THE INVENTION

In accordance with the present disclosure, the main object is to secure redundancy for dealing with a failure in main brake unit by changing control methods of the redundancy brake unit depending on a failure type of the main brake unit, and braking the vehicle in cooperation with the main brake unit.

Some embodiments of the present disclosure will now be described in detail with reference to exemplary drawings. It should be noted that, when reference numerals are added to the components in each drawing, the same components have the same numerals as possible, even if they are shown on different drawings. In the description of the present disclosure, a detailed description of a related known configuration or function is omitted when it is determined that the gist of the disclosure can be made.

In describing the components of the embodiments in accordance with the present disclosure, reference numerals such as first, second, i), ii), a), and b) may be used. Such symbols are only for distinguishing the components from other components, and the nature or order of the components is not limited by the symbols. When a portion in the specification is referred to as "comprising" or "including" a component, it means that the component may further comprise other components rather than excluding other components unless explicitly stated to the contrary.

Figure 1:
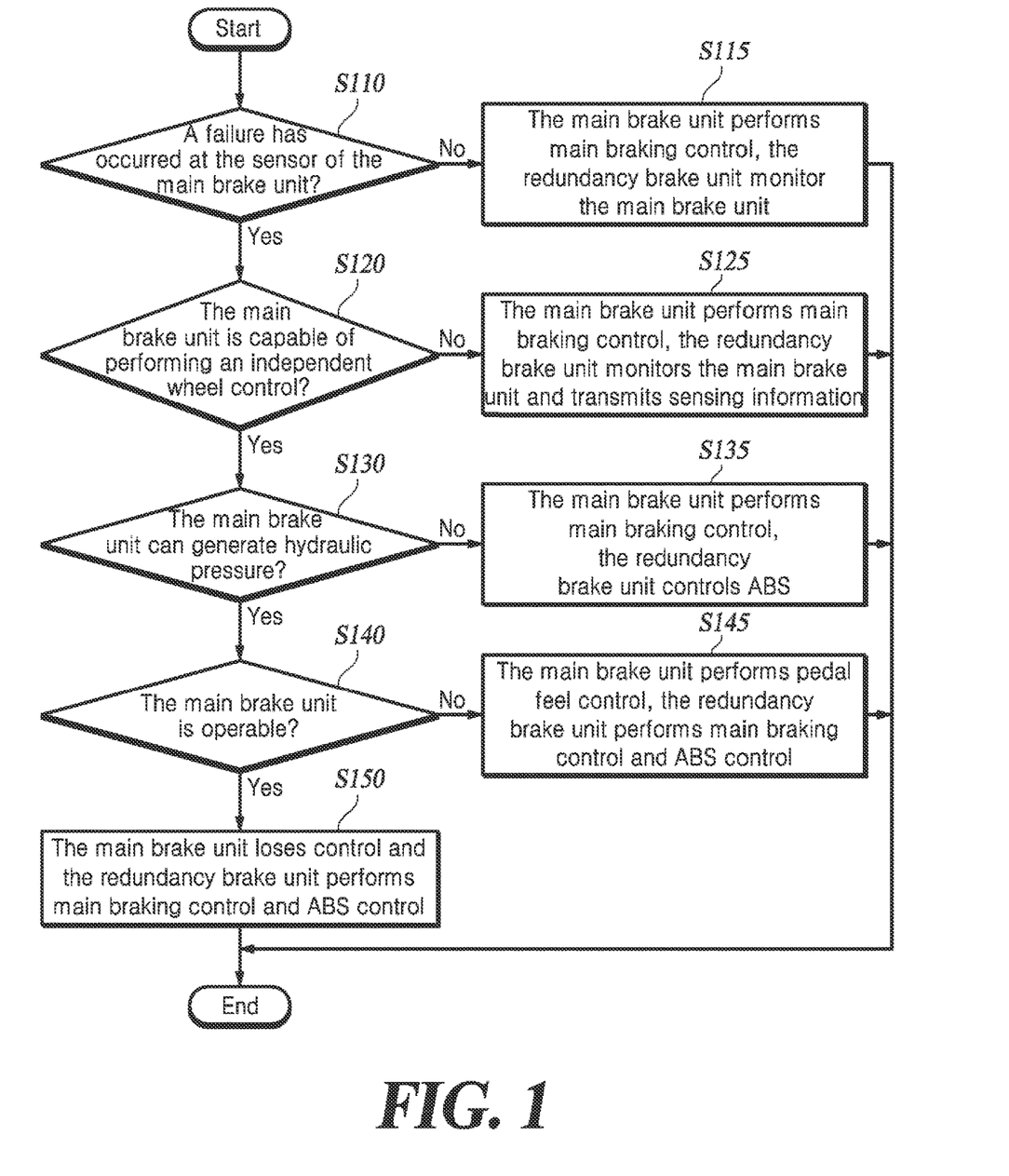
FIG. 1 is a flow diagram illustrating an algorithm relating to redundancy control of a main brake unit and a redundancy brake unit in accordance with an embodiment of the present disclosure.

FIG. 1 is a flow diagram illustrating an algorithm relating to redundancy control of a main brake unit and a redundancy brake unit in accordance with an embodiment of the present disclosure.

Figure 2:
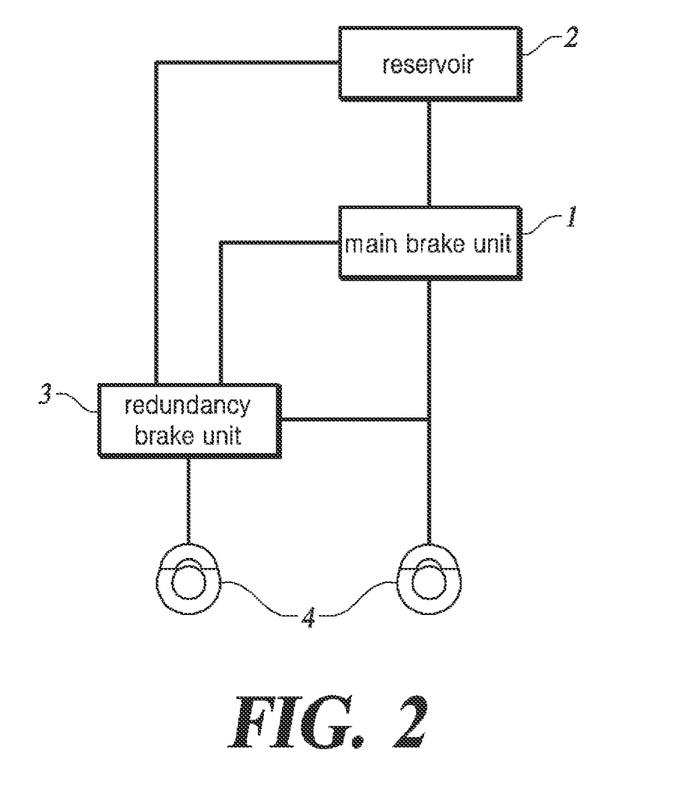
FIG. 2 is a block diagram schematically illustrating an apparatus for electro-hydraulic brake in accordance with an embodiment of the present disclosure.

Referring to FIG. 1, a control algorithm in accordance with an embodiment of the present disclosure varies according to failure types of a main brake unit (FIG. 2, 1) and a redundancy brake unit (FIG. 2, 3). In FIG. 1, the failure type is roughly classified into four types, and each failure type-specific control method is described.

The four failure types are a sensor failure type in which a failure occurs in a sensor connected to the main brake unit 1, an independent wheel control failure type in which the main brake unit 1 cannot perform an independent wheel control due to a failure of various valves that control the hydraulic circuit, a hydraulic pressure generation failure type in which a failure occurs in a motor (FIG. 3, 129) of the main brake unit 1 that the main brake unit 1 is unable to generate the hydraulic pressure, and an inoperable failure type in which the main brake unit 1 is not operable because a power is not supplied to the main brake unit 1.

The redundancy brake unit 3 determines whether a failure has occurred at the sensor of the main brake unit 1 (S110).

Here, the event where a failure has occurred at the sensor includes, for example, an event where the failure occurs in a wheel speed sensor connected to the main brake unit 1 so that the main brake unit 1 does not receive a wheel speed information from the wheel speed sensors or does not receive pressure information from a pressure sensor in the hydraulic circuit.

In addition, at Step S110, not only when a failure has occurred at the sensor connected to the main brake unit 1, but also when the failure has occurred at in-vehicle communications, e.g., a controller area network (CAN) communications, in which information is transmitted and received between the sensor and the main brake unit 1, it is determined as a sensor failure type. The reason is that even if a failure occurs in the in-vehicle communications, the main brake unit 1 cannot receive the information provided by the sensor from the sensor, and therefore, in the detailed description of the present disclosure, it is also treated the same as the type in which a failure has occurred at a case where a failure occurs in the in-vehicle communications between the sensor connected with the main brake unit 1 and the main brake unit 1.

If it is determined that no failure has occurred at the sensor of the main brake unit 1, the main brake unit 1 continues to perform a main braking control (S115). The main braking control means that the main brake unit 1 is properly operable so that the main brake unit 1 alone can control the braking of the vehicle. For example, it means a state in which the main brake unit 1 can brake the vehicle by using Anti-lock Brake System (ABS) control or by using all other control functions. When the main brake unit 1 performs main braking control, the redundancy brake unit 3 does not participate in the braking of the vehicle, and continuously monitors the malfunction of the main brake unit 1.

Meanwhile, when it is determined that a failure has occurred at the sensor of the main brake unit 1, the redundancy brake unit 3 determines whether or not the main brake unit 1 is capable of performing an independent wheel control (S120). Here, the independent wheel control means a control method in which the main brake unit 1 separately controls the front left wheel, the front right wheel, the rear left wheel and the rear right wheel.

The main brake unit 1 does not perform the independent-wheel control in case of general braking, but the main brake unit 1 has to perform the independent wheel control for cases like ABS control to apply different braking forces for each wheel. That is, the main brake unit 1 being unable to perform the independent wheel control means that it cannot perform the ABS control.

If it is determined at Step S120 that the main brake unit 1 can perform independent wheel control, the main driving unit 1 continues to perform main braking control (S125).

Here, the difference between the steps S115 and S125 is described, and in the step S115, since the sensor connected to the main brake unit 1 is operable, the main brake unit 1 can receive information such as a wheel speed from the sensor. However, since a failure has occurred at the sensor connected to the main brake unit 1 in the process S125, the main brake unit 1 cannot receive information from the sensor. Therefore, in the step S125, the redundancy brake unit 3 continues to monitor the failure of the main brake unit 1 in the same manner as in the process S115, and transmits the information transmitted from the sensor connected to the redundancy brake unit 3 to the main brake unit 1 (S125). For example, even if the main brake unit 1 cannot receive the wheel speed information from the wheel speed sensor connected to the main brake unit 1, since the redundancy brake unit 3 transmits the wheel speed information received from the wheel speed sensor coupled to the redundancy brake unit 3 to the main brake unit 1, the main brake unit 1 can use the wheel speed information.

Meanwhile, when it is determined that the main brake unit 1 cannot perform independent wheel control at Step S120, the redundancy brake unit 3 determines whether or not the main brake unit 1 can generate hydraulic pressure (S130).

If it is determined at Step S130 that the main brake unit 1 is capable of generating hydraulic pressure, the main brake unit 1 continues to perform its main braking control (S135). However, to describe the difference between the S125 process and the S135 process, the ABS control can be used because the main brake unit 1 is capable of the independent wheel control in the step S125, but in the step S135, the main brake unit 1 can generate hydraulic pressure but cannot perform independent wheel control. That is, the main brake unit 1 can supply the same hydraulic pressure to each wheel, but cannot supply different hydraulic pressures to each wheel for the sake of ABS control. Since the main brake unit 1 that cannot perform the independent wheel control cannot use the ABS control, the redundancy brake unit 3, instead of the main brake unit 1, performs the ABS control (S135).

Meanwhile, when it is determined that the main brake unit 1 cannot generate hydraulic pressure at Step S130, the redundancy brake unit 3 determines whether or not the main brake unit 1 is operable (S140).

Here, an example of the inoperable is when the power of the main brake unit 1 is turned off and the main brake unit 1 cannot perform the control function.

If it is determined that the main brake unit 1 is operable at Step S140, the main brake unit performs pedal feel control (S145). The main brake unit 1 uses internal hydraulic pressure of the pedal cylinder unit (FIG. 3,110) to provide a pedal feel for the driver by forming a reaction force corresponding to the depression of the driver's brake pedal (119 of FIG. 3) although the main brake unit 1 cannot generate hydraulic pressure and cannot supply the braking force to the vehicle.

In order for the main brake unit 1 to perform pedal feel control, the main brake unit 1 must apply power to the first backup valve (FIG. 3, 122) and the second backup valve (FIG. 3, 124) to keep the solenoid valve on. When power is applied to the first backup valve 122 and the second backup valve 124, the brake fluid in the pedal cylinder unit 110 does not flow out to the redundancy brake unit 3, but generates a reaction force against pedal depression by the driver. Therefore, the main brake unit 1 cannot form a braking force, but it is possible to perform pedal feel control by applying power to the first backup valve 122 and the second backup valve 124 and by using internal hydraulic pressure inside the pedal cylinder unit 110.

Meanwhile, since the main brake unit 1 cannot form a braking force, the redundancy brake unit 3 must perform main braking control (S145). The main braking control by the redundancy brake unit 3 is somewhat different from that of the main brake unit 1. When the main brake unit 1 cannot form a braking force, redundancy can be secured by designing the redundancy brake unit 3 to perform in place of the main brake unit 1.

The difference between the main braking control by the redundancy brake unit 3 and the main braking control by the main brake unit is that the main brake unit 1 can form a braking force on both the front wheel and the rear wheel, but the redundancy brake cylinder 3 can form a braking force only on the front wheel. Therefore, although the braking performance of the redundancy brake unit 3 is somewhat lower than that of the main brake unit 1, in an emergency situation where the main brake part 1 malfunctions, it is possible to brake the vehicle by braking only the front wheels. In addition, as with the main brake unit 1, the redundancy brake unit 3 can also perform the ABS control. The main brake unit 1 supplies the braking force to each of the four wheels independently to perform the ABS control, while the redundancy brake unit 3 supplies the braking force to each of the left front wheel and the right front wheel independently to perform the ABS control.

Meanwhile, when it is determined at Step S140 that the main brake unit 1 malfunctions, the main brake unit 1 loses control and the redundancy brake unit 3 performs all the control functions (S150).

Here, to describe the difference between the process S145 and process S150, the main brake unit 1 is not turned off at Step S145, and thus the solenoid valve can be opened and closed by supplying power to the first backup valve 122 and the second backup valve 124, but at Step 150, the main brake unit 1 can be turned off and thus it is impossible to supply power to both the first backup valve 122 and second backup valve 124. Therefore, at Step S150, the main brake unit 1 cannot perform the pedal feel control by using the hydraulic pressure of the pedal cylinder unit 110.

FIG. 2 is a block diagram schematically illustrating an apparatus for electro-hydraulic brake in accordance with an embodiment of the present disclosure.

Figure 3:
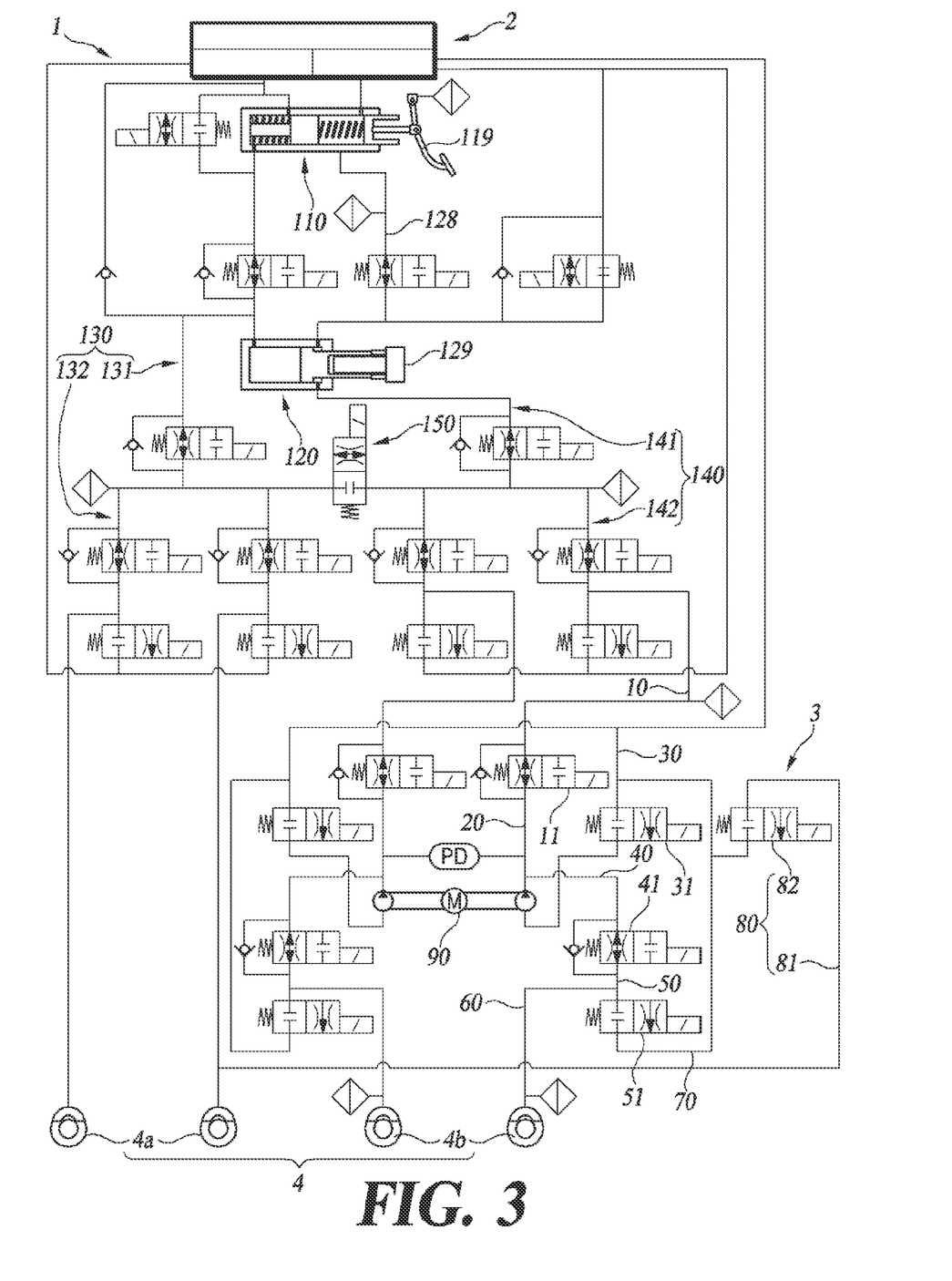
FIG. 3 is a diagram illustrating an apparatus for electro-hydraulic brake in accordance with an embodiment of the present disclosure.

FIG. 3 is a diagram illustrating an apparatus for electro-hydraulic brake in accordance with an embodiment of the present disclosure.

Referring to FIGS. 2 and 3, an apparatus or system for electro-hydraulic brake in accordance with an embodiment of the present disclosure comprises a main brake unit 1, a reservoir 2, a redundancy brake unit 3, and a wheel cylinder unit 4.

The main brake unit 1 supplies brake fluid to the plurality of wheel cylinder units 4 by driving the motor 129. The reservoir 2 is connected to the main brake unit 1, and the brake fluid is temporarily stored therein. The redundancy brake unit 3 is connected to the main brake unit 1 and the reservoir 2. The redundancy brake unit 3 provides brake fluid to some of the plurality of wheel cylinder units 4 in the event of a failure of the main brake unit 1.

That is, when a failure occurs in the main brake unit 1 in an electronic braking device of an electric, hybrid, or autonomous vehicle, the apparatus for electro-hydraulic brake in accordance with an embodiment of the present disclosure is capable of performing an emergency braking by operating the redundancy brake unit 3.

Here, the failure type of the main brake unit 1 may be a sensor failure type in which a failure has occurred at a sensor connected to the main brake unit 1, an independent wheel control failure type in which the main brake unit 1 cannot perform the independent wheel control due to a failure of various valves that control the hydraulic circuit, a hydraulic pressure generation failure type in which a failure occurs in a motor 129 of the main brake unit 1 so the main brake unit 1 is unable to generate the hydraulic pressure, and an inoperable failure type in which the main brake unit 1 is not operable because power is not supplied to the main brake unit 1.

The main brake unit 1 in accordance with an embodiment of the present disclosure includes a pedal cylinder unit 110, a master cylinder unit 120, a first main hydraulic pressure unit 130, a second main pressure unit 140, and a third main hydraulic pressures unit 150.

The pedal cylinder unit 110 generates hydraulic pressure by pressing the pedal 119. This pedal cylinder unit 110 can form two chambers, and can provide a depressing force corresponding to the depression of the pedal 119.

The master cylinder unit 120 detects whether or not the pedal 119 is actuated, and generates hydraulic pressure by driving the motor 129. The master cylinder unit 120 may form one chamber, and the motor 129 may be driven in the forward direction or the reverse direction depending on the pressed state of the pedal 119. The master cylinder unit 120 may be connected to the pedal cylinder unit 110 by using a cylinder line unit 128.

The first main hydraulic pressure unit 130 is connected to the master cylinder unit 120, and supplies brake fluid to some of the plurality of wheel cylinder units 4.

More specifically, the first main hydraulic pressure unit 130 may include a first-first hydraulic pressure line unit 131 that is connected to the master cylinder unit 120 and supplies brake fluid, and a first-second hydraulic pressure line unit 132 that is connected to and branched from the first-first hydraulic pressure line unit 131 and supply brake fluid to a first wheel cylinder unit 41a. Here, the two first wheel cylinder units 41a may each be disposed on the rear wheel.

The second main hydraulic pressure unit 140 connects the master cylinder unit 120 to the redundancy brake unit 3, and supplies the brake hydraulic pressure to the rest of the plurality of wheel cylinder units 4.

More specifically, the second main hydraulic pressure unit 130 may include a second-first hydraulic pressure line unit 141 that is connected to the master cylinder unit 120 and supplies brake fluid, and a second-second hydraulic pressure line unit 142 that is connected to and branched from the second-first hydraulic line pressure unit 141 and supply brake fluid to the redundancy brake unit 3. Here, the redundancy brake unit 3 can be connected to the second wheel cylinder unit 4b, and the two second wheel cylinder units 4b may be disposed on the front wheel.

Meanwhile, the first wheel cylinder units 41a may be disposed on the front wheel, the second wheel cylinder units 4b may be disposed on the rear wheel, and the redundancy brake unit 3 may be connected to the main powered wheel in the vehicle driving manner.

The third main hydraulic pressure unit 150 connects or disconnects between the first main hydraulic pressure unit 130 and the second main hydraulic pressure unit 140. For example, the third main hydraulic pressure unit 150 may connect the first-second hydraulic pressure line units 132 to the second-second hydraulic pressure line units 142.

In addition, the first main hydraulic pressure unit 130 may be connected to the redundancy brake unit 3. That is, when any one of the first-second hydraulic pressure line units 132 is connected to the hydraulic circuit of the redundancy brake unit 3, the first main hydraulic pressure unit 130 may be controlled by the redundancy brake unit 3 in an emergency state.

The redundancy brake unit 3 in accordance with an embodiment of the present disclosure includes a first redundancy flow unit 10, a second redundancy flow unit 20, a third redundancy flow unit 30, a fourth redundancy flow unit 40, a fifth redundancy flow unit 50, and a sixth redundancy flow unit 60.

The first redundancy flow unit 10 is connected to the second main hydraulic pressure unit 140, and the oil passage is opened and closed by a first valve unit 11 to supply brake fluid. For example, the two first redundancy flow units 10 may be respectively connected to the branched second-second hydraulic pressure line units 142.

The second redundancy flow unit 20 connects the first valve unit 11 to an electric pump unit 90 to supply brake fluid. For example, the second redundancy flow unit 20 may have one end connected to each of the first valve units 11 and the other end connected to the electric pump unit 90. The electric pump unit 90 is a device that forcibly supplies the brake fluid to the redundancy brake unit 3 when power is applied. For example, the brake fluid may be supplied to the redundancy brake unit 3 by being driven when a failure occurs in the main brake unit 1.

The third redundancy flow unit 30 connects the reservoir 2 and the electric pump unit 90 to supply brake fluid. The third redundancy flow unit 30 is opened and closed by the third valve unit 31. For example, one end of the third redundancy flow unit 30 may be connected to the reservoir 2, and may be branched into a pair so that another end is connected to the electric pump unit 90.

The fourth redundancy flow unit 40 is connected to the second redundancy flow unit 20 to supply the brake fluid. The fourth redundancy flow unit 40 is opened and closed by the fourth valve unit 41. For example, the fourth redundancy flow unit 40 may have one end connected to each of the second redundancy flow units 20. The other end of the fourth redundancy flow unit 40 may be connected to the fourth valve unit 41.

The fifth redundancy flow unit 50 is connected to the fourth valve unit 41 to supply the brake fluid. The fifth redundancy flow unit 50 is opened and closed by the fifth valve unit 51. For example, the fifth redundancy flow unit 50 may be connected at one end to the fourth valve unit 41, and at the other end to a fifth valve unit 51.

The sixth redundancy flow unit 60 connects the fifth redundancy flow unit 50 and the wheel cylinder unit 4 to supply the brake fluid. For example, the sixth redundancy flow unit 60 may be connected at one end to the fifth redundancy flow unit 50 respectively and at the other end thereof to the second wheel cylinder unit 4b respectively.

The redundancy brake unit 3 in accordance with an embodiment of the present disclosure may further include a seventh redundancy flow unit 70. The seventh redundancy flow unit 70 connects the fifth valve unit 51 to the third redundancy flow unit 30 to supply the brake fluid.

The first valve unit 11 and the fourth valve unit 41 are normal open valves, and the third valve unit 31 and the fifth valve unit 51 are normal close valves.

That is, when power is not applied, the first valve unit 11 and the fourth valve unit 41 may open the flow paths to allow the brake fluid to flow, and when the power is applied, it is possible to close the flow paths to restrict a brake liquid flow.

When power is not applied, the third valve unit 31 and the fifth valve unit 51 close the flow paths to restrict the flow of the brake fluid, and when power is applied, it is possible to open the flow paths to allow the flow thereof.

The apparatus for electro-hydraulic brake in accordance with an embodiment of the present disclosure may further include a recovery unit 80. The recovery unit 80 connects the main brake unit 1 to the redundancy brake unit 3, and induces the brake fluid of the main brake unit 1 to bypass the reservoir 2 when an operation error of the main brake part 1 occurs.

More specifically, the recovery unit 80 includes a recovery flow unit 81 and a recovery valve unit 82. At least one recovery flow unit 81 connects the main brake unit 1 and the redundancy brake unit 3, and the recovery valve unit 82 is formed in the recovery flow unit 81 to open and close the flow paths. A normal close valve is used as the recovery valve unit 82. That is, when no power is applied, the recovery valve unit 82 closes the recovery flow unit 81 to limit the flow of the brake fluid, and when power is applied, the recovery valve unit 82 opens the recovery flow unit 81 to allow the flow of the brake liquid.

For example, the recovery flow unit 81 may supply the brake fluid by connecting the first main hydraulic pressure unit 130 to the seventh redundancy flow unit 70. Here, the recovery flow unit 81 may be connected to any one of the two seventh redundancy flow units 70.

Figure 4:
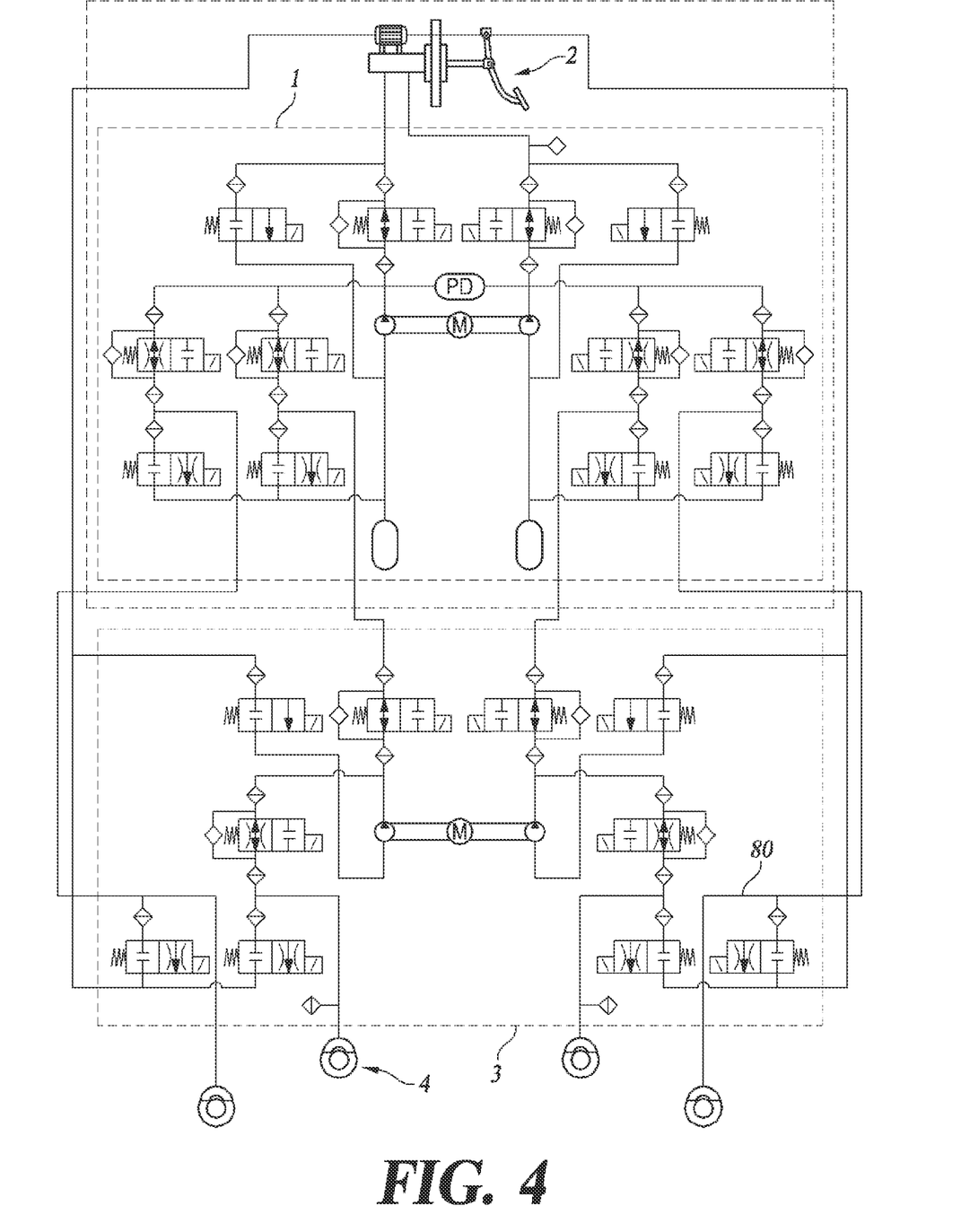
FIG. 4 is a diagram illustrating an apparatus for electro-hydraulic brake in accordance with another embodiment of the present disclosure.

FIG. 4 is a diagram illustrating an apparatus for electro-hydraulic brake in accordance with other embodiment of the present disclosure.

Figure 5:
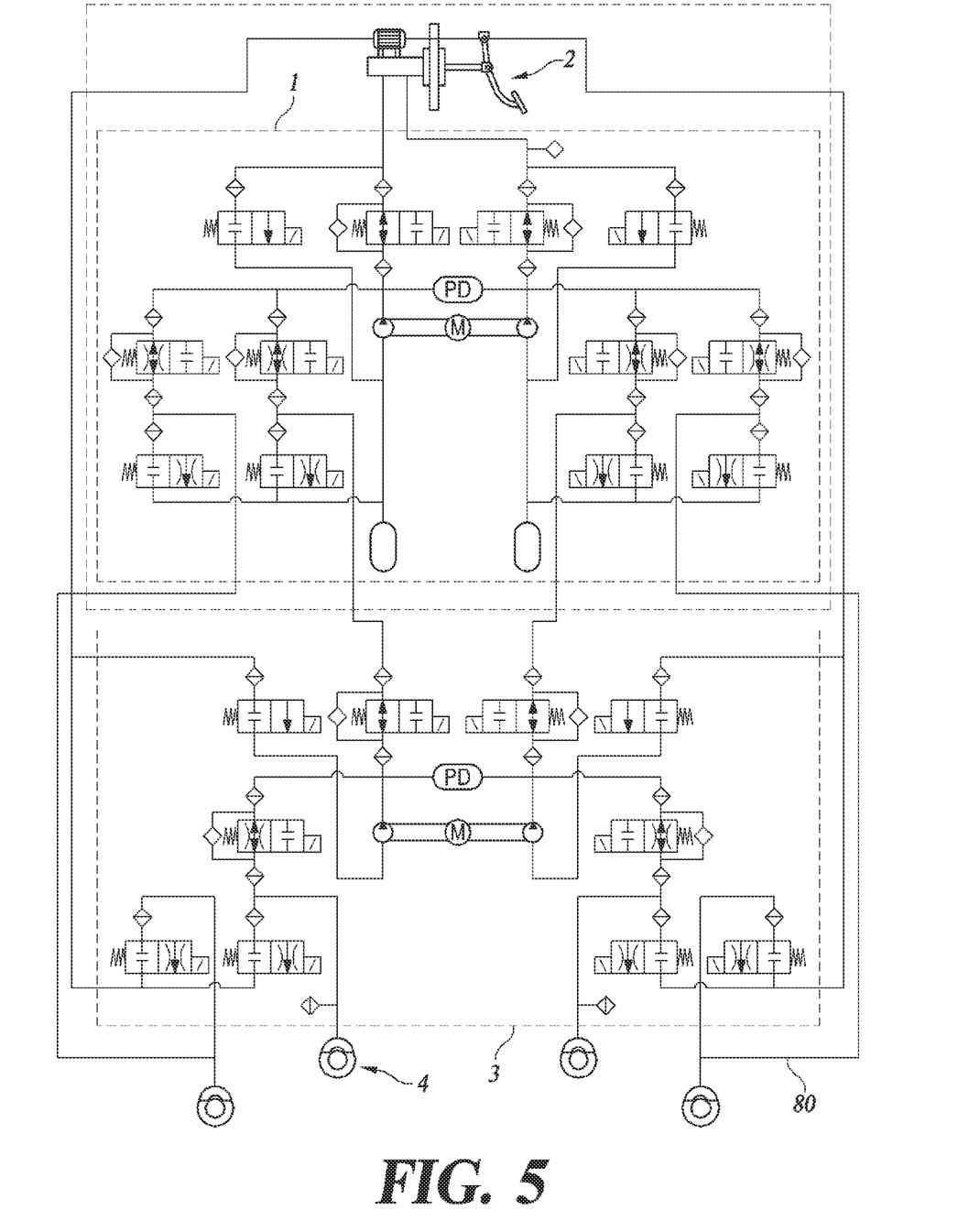
FIG. 5 is a diagram illustrating an apparatus for electro-hydraulic brake in accordance with yet another embodiment of the present disclosure.

FIG. 5 is a diagram illustrating an apparatus for electro-hydraulic brake in accordance with another embodiment of the present disclosure.

Referring to FIGS. 4 and 5, the brake fluid from the main brake unit 1 is connected to the wheel cylinder unit 4 via the redundancy brake unit 3, and the number of recovery units 80 is two, and also in the x-split type, the brake liquid provided in the wheel cylindrical unit 4 is diverted to the reservoir 2. That is, when braking is applied by the redundancy brake unit 3 due to the occurrence of an error in the main brake unit 1, the wheel cylinder unit 4 which is not controlled by the redundancy brake unit 3 may be controlled by another braking device such as EPB (Electronic Parking Brake). Even if the brake fluid is transmitted to the wheel cylinder unit 4 that is not controlled by the redundancy brake unit 3 when the driver pushes the pedal, the recovery unit 80 may be used to bypass the reservoir 2 to prevent interference with other braking devices such as EPB. The number of wheel cylinder units 4 connected to the recovery unit 80 may be one or more, and the number of valves may be one or more depending on the automobile piping.

In the apparatus for electro-hydraulic brake in accordance with an embodiment of the present disclosure, the main brake unit 1 and the redundancy brake unit 3 are connected by a hydraulic circuit, and when an operation error occurs in the main brake unit 1, the redundancy brake unit 3 is performs braking.

The foregoing description is merely illustrative of the teachings of the present embodiments, and various modifications and changes may be made without departing from the essential characteristics of the embodiments by those skilled in the art. Therefore, the present embodiments are not intended to limit the technical idea of the present embodiment, but are intended to be described, and the scope of the technical concept of this embodiment is not limited by this embodiment. The scope of protection of the present embodiment is to be interpreted by the following claims, and all technical ideas that fall within the equivalent scope thereof should be interpreted to be included in the scope of the present embodiment.

What is claimed is:

1. A method of controlling an electro-hydraulic brake system comprising a main brake unit and redundancy brake unit, the method comprising:
    determining a failure type for failures of the main brake unit, the failure type being one of:
        a sensor failure type comprising a failure in which sensor information from a first sensor connected to the main brake unit is not received by the main brake unit;
        an independent wheel control failure type comprising a failure at the main brake unit to perform independent wheel control;
        a hydraulic pressure generation failure type comprising a failure of the main brake unit to generate a hydraulic pressure; and
        an inoperable failure type comprising the main brake being inoperable; and
    in response to determining that the failure type is the sensor failure type or the independent wheel control failure type, causing the main brake unit to generate a braking force,
    in response to determining that the failure type is the hydraulic pressure generation failure type or the inoperable failure type, causing the redundancy brake unit to generate the braking force, and
    in response to determining that the failure type is the sensor failure type, causing the redundancy brake unit to perform functions of:
        monitoring the main brake unit; and
        transmitting, to the main brake unit, sensing information received from a second sensor connected to the redundancy brake unit,
        wherein the main brake unit performs main braking control by using the sensing information from the second sensor.

2. A method of controlling an electro-hydraulic brake system comprising a main brake unit and redundancy brake unit, the method comprising:
    determining a failure type for failures of the main brake unit, the failure type being one of:
        a sensor failure type comprising a failure in which sensor information from a first sensor connected to the main brake unit is not received by the main brake unit;
        an independent wheel control failure type comprising a failure at the main brake unit to perform independent wheel control;
        a hydraulic pressure generation failure type comprising a failure of the main brake unit to generate a hydraulic pressure; and
        an inoperable failure type comprising the main brake being inoperable; and
    in response to determining that the failure type is the sensor failure type or the independent wheel control failure type, causing the main brake unit to generate a braking force,
    in response to determining that the failure type is the hydraulic pressure generation failure type or the inoperable failure type, causing the redundancy brake unit to generate the braking force, and,
    in response to determining that the failure type of the main brake unit is the independent wheel control failure type, performing:
        causing the redundancy brake unit to perform an Antilock Brake System (ABS) control, and
        causing the main brake unit to perform a main braking control.

3. A method of controlling an electro-hydraulic brake system comprising a main brake unit and redundancy brake unit, the method comprising:
    determining a failure type for failures of the main brake unit, the failure type being one of:
        a sensor failure type comprising a failure in which sensor information from a first sensor connected to the main brake unit is not received by the main brake unit;
        an independent wheel control failure type comprising a failure at the main brake unit to perform independent wheel control;
        a hydraulic pressure generation failure type comprising a failure of the main brake unit to generate a hydraulic pressure; and
        an inoperable failure type comprising the main brake being inoperable; and
    in response to determining that the failure type is the sensor failure type or the independent wheel control failure type, causing the main brake unit to generate a braking force,
    in response to determining that the failure type is the hydraulic pressure generation failure type or the inoperable failure type, causing the redundancy brake unit to generate the braking force, and,
    in response to determining that the failure type is the hydraulic pressure generation failure type, performing:
        causing the redundancy brake unit to perform a main braking control; and
        causing the main brake unit to perform a pedal feel control.

4. The method of claim 1, further comprising, in response to determining that the failure type is the inoperable failure type, performing:

preventing the main brake unit from being involved in braking of the vehicle; and
causing the redundancy brake unit to perform a main braking control.

5. An electro-hydraulic brake system comprising:
a wheel cylinder unit configured to provide a braking force to front wheels and rear wheels of a vehicle;
a main brake unit comprising a pedal cylinder unit configured to change a pressure of a brake fluid in response to a pedal input from a driver, and a master cylinder unit configured to change the pressure of the brake fluid in conjunction with a motor;
a redundancy brake unit comprising an electric pump unit configured to pump the brake fluid; and
a reservoir configured to store the brake fluid and supply the brake fluid to the main brake unit and the redundancy brake unit,
wherein:
the redundancy brake unit is configured to monitor the main brake unit for failures and to determine a failure type for the failures, the failure type being one of a sensor failure type, an independent wheel control failure type, a hydraulic pressure generation failure type, and an inoperable failure type,
when the failure type is the sensor failure type or the independent wheel control failure type, the main brake unit is used to generate a braking force, and
when the failure type is the hydraulic pressure generation failure type or the inoperable failure type, the redundancy brake unit is used to generate the braking force, and
further comprising:
a hydraulic circuit including a sensor,
wherein, when the failure type of the main brake is the sensor failure type, the redundancy brake unit is configured to transmit sensing information received from the sensor to the main brake unit, and the main brake unit is configured to perform main braking control based on the sensing information transmitted from the redundancy brake unit.

6. An electro-hydraulic brake system comprising:
a wheel cylinder unit configured to provide a braking force to front wheels and rear wheels of a vehicle;
a main brake unit comprising a pedal cylinder unit configured to change a pressure of a brake fluid in response to a pedal input from a driver, and a master cylinder unit configured to change the pressure of the brake fluid in conjunction with a motor;
a redundancy brake unit comprising an electric pump unit configured to pump the brake fluid; and
a reservoir configured to store the brake fluid and supply the brake fluid to the main brake unit and the redundancy brake unit,
wherein:
the redundancy brake unit is configured to monitor the main brake unit for failures and to determine a failure type for the failures, the failure type being one of a sensor failure type, an independent wheel control failure type, a hydraulic pressure generation failure type, and an inoperable failure type,
when the failure type is the sensor failure type or the independent wheel control failure type, the main brake unit is used to generate a braking force, and
when the failure type is the hydraulic pressure generation failure type or the inoperable failure type, the redundancy brake unit is used to generate the braking force, and,
wherein, when the failure type of the main brake is the independent wheel control failure type, the main brake unit is configured to perform main braking control, and the redundancy brake unit is configured to control the front wheels using anti-lock brake system (ABS) control.

7. An electro-hydraulic brake system comprising:
a wheel cylinder unit configured to provide a braking force to front wheels and rear wheels of a vehicle;
a main brake unit comprising a pedal cylinder unit configured to change a pressure of a brake fluid in response to a pedal input from a driver, and a master cylinder unit configured to change the pressure of the brake fluid in conjunction with a motor;
a redundancy brake unit comprising an electric pump unit configured to pump the brake fluid; and
a reservoir configured to store the brake fluid and supply the brake fluid to the main brake unit and the redundancy brake unit,
wherein:
the redundancy brake unit is configured to monitor the main brake unit for failures and to determine a failure type for the failures, the failure type being one of a sensor failure type, an independent wheel control failure type, a hydraulic pressure generation failure type, and an inoperable failure type,
when the failure type is the sensor failure type or the independent wheel control failure type, the main brake unit is used to generate a braking force, and
when the failure type is the hydraulic pressure generation failure type or the inoperable failure type, the redundancy brake unit is used to generate the braking force, and
further comprising:
a pedal cylinder unit,
wherein, when the failure type of the main brake is the hydraulic pressure generation failure type, the redundancy brake unit is configured to perform main braking control, and the main brake unit is configured to perform pedal feel control for the pedal cylinder unit to provide a reaction force feel to the driver.

8. The electro-hydraulic brake system of claim 5, wherein, when the failure type of the main brake is the inoperable failure type, the redundancy brake unit is configured to perform main braking control.

* * * * *